United States Patent Office 3,484,473
Patented Dec. 16, 1969

3,484,473
METHYLENE BISESTERS OF THIOLSULFONIC ACIDS
John D. Buckman, John D. Pera, and Fred W. Raths, Memphis, Tenn., assignors to Buckman Laboratories, Inc., Memphis, Tenn., a corporation of Tennessee
No Drawing. Filed May 12, 1967, Ser. No. 637,897
Int. Cl. C07c *143/84*
U.S. Cl. 260—453    7 Claims

ABSTRACT OF THE DISCLOSURE

Esters having the formula:

$$RSO_2SCH_2SSO_2R'$$

wherein R and R' independently represent straight or branched chain alkyl groups containing from 1 to 6 carbon atoms, alicyclic groups, aryl groups or substituted aryl groups where 1 to 3 of the hydrogens thereof are replaced by an alkyl group, halogen, hydroxy or a nitro group are useful as microbicides and fungicides.

---

This invention relates to novel, methylene bisesters of thiolsulfonic acids, their preparation, and their use in controlling bacterial and fungal growth. More particularly, the products of the present invention are useful in combating bacteria and fungi in industrial and agricultural processes and products.

Many industrial products, both during the process of manufacture and as the finished product, are normally susceptible to fungal and bacterial degradation if means are not taken to inhibit such degradation. Wood pulp, starch and proteinaceous substances, animal hides, vegetable tanning liquors, and leather are all damaged or degraded by the growth of fungi, bacteria, and other microorganisms or by enzymes produced by such growth. Wet pulp containing more than about 30 pct. moisture content is subject to attack by stain, mold, and decay fungi. If not controlled, the result is a loss of useful fiber in badly decayed pulp, difficulty in dispersing partially decayed pulp, a darkening in color, and the development of undesirable odors caused by the growth of the microorganisms. Different species of molds are encountered at various stages in the manufacture of leather. As an example, soaking provides an environment highly conducive to the growth of microorganisms, and even strong pickle solutions are subject to attack by some microorganisms. Molds in particular may be troublesome and cause discoloration of the pickled stock, especially if it is held for a period of time. During the chrome tanning process, the stock readily molds and is discolored. Mold growth may develop on heavy vegetable tanned leather during the drying period and produce spots and stains on either the flesh or grain sides.

The methylene bisesters of thiolsulfonic acids of our invention are used as seed, plant, and soil fungicides for protecting seeds, seedlings emerging from seeds, and plants against attack by fungi. An important use of our composition is the control of fungi and bacteria on fruits, vegetables, berries, flowers, tobacco, grasses, and cereals and such microorganisms are responsible for large economic losses in the agricultural field.

In addition, many fungi and bacteria which inhabit soils are responsible for both preemergence and postemergence damping off of seedlings as well as other deleterious effects. As a result, improved methods for the control of such microorganisms are desirable.

Numerous species of both bacteria and fungi are responsible for the degradation or deterioration of industrial and agricultural products.

Another aspect of the problem of controlling microorganisms in the pulp and papermaking industry is that the water used in the papermaking process contains quantities of cellulosic materials which vary in concentration from about 0.1 pct. to 50.0 pct. by weight. Many chemical microbiological agents have the tendency to be selectively adsorbed by the fiber, thus in effect inactivating the inhibitor. To be effective in the control of microorganisms in pulp and paper mills, it is extremely desirable that the chemical be able to control the growth of a number of species of microorganisms and, in addition, such agent should not be adsorbed on the cellulosic fibers.

Various microbiological agents have been suggested for use in the control of the microorganisms listed above including fungi and bacteria. While these suggested agents have certain advantages when employed for a particular purpose and for a specific microorganism, the results have not been entirely satisfactory. For example, the organic mercury compounds are very effective when employed against certain specific bacteria but are expensive and toxic; consequently, great care must be exercised in their use. As another example, chlorine is an effective microbicide but is also very corrosive to many metals.

It is, therefore, a principal object of the present invention to provide as a new composition of matter methylene bisesters of thiolsulfonic acids for the control of microorganisms and other purposes which obviate the disadvantages of the prior art compositions.

It is another object of this invention to provide a composition for the control of microorganisms in industrial process systems containing cellulosic, proteinaceous, and other biodegradable materials.

It is yet another object of this invention to provide an improved process for controlling fungal soil infestations, which comprises applying to the soil a mixture containing methylene bisesters of thiolsulfonic acids.

It is yet another object of this invention to provide a process for controlling soil fungi, such as those of the genera *Fusarium, Pythium, Rhizoctonia,* and *Alternaria.*

Yet another object of the present invention is the provision of a process for controlling the preemergence and postemergence damping off of seedlings in nurseries, greenhouses, and farms.

These and other objects and advantages of the invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

In brief, the foregoing objects and advantages are obtained by a process which comprises the addition to the aqueous fluids of a methylene bisester of a thiolsulfonic acid having the formula:

$$RSO_2SCH_2SSO_2R'$$

wherein R and R' may be the same or different and represent straight or branched chain alkyl groups containing from 1 to 6 carbon atoms; alicyclic groups; aryl groups or substituted aryl groups where 1 to 3 of the hydrogens thereof are replaced by an alkyl group, halogen, hydroxy, or a nitro group. In addition, the substituents attached to the aryl group may be the same or different.

The lowest concentration of the methylene bisesters of thiolsulfonic acids used in our laboratory experiments was 0.05 part per million parts of water. As to the amount of the methylene bisesters of thiolsulfonic acids which may be added to aqueous systems when used for the control of microorganisms, suitable quantities vary from 0.05 to 500 parts per million parts of water. If, however, the ratio of water to organic material is low, for example, 10 to 1 or less, suitable quantities of the esters to be added to the system vary from 0.1 to 1,000 parts per million parts of the organic material. It will be understood, of course, that larger quantities of the esters may be used with no detrimental effect, but such larger quantities increase the cost of operation with limited material benefit.

Various bisesters of thiolsulfonic acids have been described in the chemical literature. For example, Otto and Rossing, Ber. 20: 2079–2088 (1887), prepared 1,2-ethylenebis(p-toluenethiolsulfonate) by the reaction of ethylenebromide and pottassium p-toluenethiolsulfonate. Chivers and Smiles, Jour. Chem. Soc. 1928, 697, used the same type of reaction to prepare 1,3-propylenebis-(p-toluenethiolsulfonate). Herz and Allen, U.S. Patent 3,047,393, have disclosed that certain esters of organic thiolsulfonic acids have a marked stabilizing effect on the stabilization of photographic silver halide emulsions. Their invention contemplates esters of the type represented by the general formula:

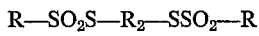

wherein R is an alkyl group containing from 1 to 4 carbon atoms and $R_2$ is an alkylene group containing 2 to 10 carbon atoms. Boldyrev, Kolmakova and Bilozor, Jour. Gen. Chem. U.S.S.R. 33: 1926–1928 (1963), disclosed compounds of the general formula:

wherein R is an alkyl group containing 1 to 4 carbon atoms or a phenyl group and $n$ is an integer varying from 2 to 5. These authors point out, however, that the subject compounds are ineffective for the control of microorganisms. Specifically, many of them exhibit no activity at all against *E. coli*, Aspergillus, Rhizopus, and Mucor. Furthermore, it was found that these compounds must be used at concentrations of at least 1.0 pct. to be effective against *Staph. aureus*, and Mycobacterium $B_5$. We have also found that the bisesters of the thiolsulfonic acids disclosed in the prior art are considerably inferior to the analogous monoesters in respect to their activity toward bacteria and fungi. In contrast, we found that the methylene bisesters of this invention are extremely effective microbicides with a high degree of activity against both bacteria and fungi at very dilute concentrations.

The compounds of this invention may be prepared by reacting the alkali-metal salts of thiolsulfonic acids with methylene bromide or methylene iodide. If water is used as the sole solvent, the product of the reaction is usually an alkyl alkanethiolsulfonate when the sodium salts of alkanethiolsulfonic acids are used. However, when a nonpolar organic solvent such as acetone is used, either alone or in excess with water, the reaction proceeds soothly as follows:

If mixtures of the sodium salts of thiolsulfonic acids are reacted with methylene bromide, the resulting product will contain mixtures of methylene bisesters of thiolsulfonic acids where the R and R' groups may be different.

The compounds of the present invention can be used alone as bactericides or fungicides or they can be applied together with inert solids to form dusts or can be suspended in a suitable liquid diluent, preferably comprising water. If desired, surface active agents or wetting agents and/or inert solids in the formulations may be used. In most cases, the active ingredient can vary from 0.01 to 95 pct. by weight of the entire composition. In place of water there can be employed organic solvents; for example, hydrocarbons such as benzene, toluene, xylene, kerosene, diesel oil, fuel oil, and petroleum naphtha; ketones such as acetone, methyl ethyl ketone; chlorinated hydrocarbons such as carbon tetrachloride, chloroform, trichlorethylene; esters such as ethyl acetate, amyl acetate, and butyl acetate; ethers such as ethylene glycol monomethyl ether and diethylene glycol monomethyl ether; alcohols such as ethanol, methanol, 2-propanol, amyl alcohol, ethylene glycol, and others such as dimethyl formamide and dimethyl sulfoxide. Mixtures of water and organic solvents either as solutions or emulsions can be employed. The bisesters of thiolsulfonic acids of this invention can also be applied with carriers such as talc, pyrophylite, synthetic fine silica, kieselguhr, chalk, diatomaceous earth, calcium carbonate, betonite, fuller's earth, wheat flour, soybean flour, pumice, tripoli, wood flour, walnut shell flour, redwood flour, and lignin. Frequently, it is desirable to incorporate a surface active agent in the fungicidal or bactericidal composition of the present invention. In general, nonionic dispersants are preferred. Examples of such nonionic dispersants include alkyl phenoxypolyoxyethylene ethanol or alkyl polyoxyethylene ethanol.

In order to disclose the nature of the invention still more clearly, the following illustrative examples will be given. It is understood, however, that the invention is not to be limited to the specific conditions or details set forth in these examples, except insofar as such limitations are specified in the appended claims.

EXAMPLE 1

Preparation of methylene bismethanethiolsulfonate

A 1,000-ml., three-necked, round bottom flask equipped with stirrer, condenser, and thermometer was charged with 40.2 g. (0.3 mole) of sodium methanethiolsulfonate, 261.0 g. (1.5 moles) of methylene bromide, and 350 ml. of acetone. The reaction mixture was then heated at reflux temperature for a period of 8 hrs. with agitation. At the end of this period, the acetone was removed by evaporation, after which the residue so obtained was dissolved in 200 ml. of methylene chloride. The resulting solution was washed twice with water and then transferred to a rotary evaporator where the methylene chloride was removed. A light orange-brown liquid was obtained as a residue. The residue, which crystallized after standing a short time, was recrystallized from a 1:3 hexanebenzene solution. A yield of 13.5 g. (38 pct.) of methylene bismethanethiolsulfonate was obtained which melted at 78–80° C.

*Analysis.*—Calc'd. for $C_3H_8O_4S_4$: S, 54.3. Found: S, 54.6.

EXAMPLE 2

Preparation of methylene bisethanethiolsulfonate

A flask as described in Example 1 was charged with 74.0 g. (0.5 mole) of sodium ethanethiolsulfonate, 348.0 g. (2.0 moles) of methylene bromide, and 400 ml. of acetone. The reaction mixture was then heated at reflux temperature for a period of 8 hrs. with agitation. At the end of this period, the mixture was filtered to remove sodium bromide. Acetone and unreacted methylene bromide were removed from the filtrate by evaporation, after which the residue, a yellow liquid-solid mixture weighing 81.6 g., was dissolved in methylene chloride. The resulting solution was washed twice with water, dried over anhydrous magnesium sulfate, and then the methylene chloride removed by evaporation. A straw-colored liquid weighing 53.3 g., exhibiting no tendency to crystallize, was obtained as a residue. This product could not be distilled at 0.2 mm. of mercury. Analysis of the product for thiolsulfonate using the procedure described by D. Barnard and E. R. Cole, Analytica Chimica Acta 20: 540–547 (1959), indicated that the product contained 88.1 pct. of methylene bisethanethiolsulfonate.

EXAMPLE 3

Preparation of methylene bis-1-propanethiolsulfonate

The procedure of Example 2 was followed with the exception that the charge to the flask consisted of 81.1 g.

(0.5 mole) of sodium 1-propanethiolsulfonate, 435.0 g. (2.5 moles) of methylene bromide, and 500 ml. of acetone. The residue, an amber-colored liquid weighing 67.3 g., which remained after removing sodium bromide, acetone, and unreacted methylene bromide, was purified by the procedure described in Example 2. A bright amber-colored liquid weighing 57.2 g., exhibiting no tendency to crystallize, was obtained as a residue. This product could not be distilled at 0.2 mm. of mercury. Analysis of the product for thiolsulfonate by the method referred to in Example 2 indicated a methylene bis-1-propanethiolsulfonate content of 85.9 pct.

EXAMPLE 4

Preparation of methylene bis-1-butanethiolsulfonate

A flask as described in Example 1 was charged with 84.0 g. (0.48 mole) of sodium 1-butanethiolsulfonate, 460.0 g. (2.6 moles) of methylene bromide, and 250 ml. of acetone. The reaction mixture was then heated at reflux temperature for a period of 6 hrs. with agitation. To the reaction mixture was then added 600 ml. of water and 200 ml. of methylene chloride. The resulting mixture was agitated and then allowed to stand, causing the separation of an aqueous layer and an organic layer. After recovering the organic layer, the solvents were removed therefrom by evaporation using a rotating evaporator. The residue was purified by the procedure described in Example 2, whereby an amber-colored liquid weighing 48.8 g., exhibiting no tendency to crystallize, was obtained. This product could not be distilled at 0.2 mm. of mercury. Analysis of the product for thiolsulfonate by the method referred to in Example 2 indicated a methylene bis-1-butanethiolsulfonate content of 75.5 pct.

EXAMPLE 5

Preparation of methylene bisbenzenethiolsulfonate

A 500-ml., three-necked, round bottom flask equipped with stirrer, condenser, and thermometer was charged with 39.4 g. (0.20 mole) of sodium benzenthiolsulfonate, 174 g. (1 mole) of methylene bromide, and 200 ml. of acetone. The reaction mixture was then heated at reflux temperature for a period of 16 hrs. with agitation. The liquid residue remaining after removing sodium bromide, acetone, and unreacted methylene bromide weighing 30.7 g., was partly purified by the method described in Example 2. The resulting product was a mixture of liquid and crystals weighing 27.3 g., representing a 74 pct. yield. This product was recrystallized from carbon tetrachloride. A yield of 4.5 g. (12 pct.) of methylene bisbenzenethiolsulfonate was obtained having a M.P. of 122–126° C.

EXAMPLE 6

Preparation of methylene bis-p-toluenethiolsulfonate

A flask as described in Example 5 was charged with 42.0 g. (0.20 mole) of sodium p-toluenethiolsulfonate, 174 g. (1.0 mole) of methylene bromide, and 200 ml. of acetone. The reaction mixture was then heated at reflux temperature for a period of 17.5 hrs. with agitation. After cooling, the reaction mixture was washed three times with 100-ml. portions of water, the organic layer dried over anhydrous magnesium sulfate, and then the acetone and unreacted methylene bromide removed by evaporation using a rotating evaporator. The residue, a tan oil weighing 19.4 g., was dissolved in 300 ml. of hot benzene. From this solution, 4.6 g. of white crystalline methylene bis-p-toluenethiolsulfonate, M.P. 164–166° C., was obtained which represented a 12 pct. yield.

EXAMPLE 7

The methylene bisesters of thiolsulfonic acids prepared in Examples 1–6 were tested by the pulp-substrate method described in U.S. Patent 2,881,070, which disclosure is hereby made a part of this application, using *Aerobacter aerogenes* and pulp substrates that were buffered to pH values of 5.5, 6.5, and 7.5, respectively. The results are tabulated in Table 1.

TABLE 1.—PERCENTAGE KILL OF *AEROBACTER AEROGENES* IN A PULP SUBSTRATE AT pH 5.5, 6.5, AND 7.5 AFTER 18 HR. CONTACT WITH THE COMPOUNDS LISTED BELOW

| pH | Concentration (p.p.m.) | Methylene bis-methanethiolsulfonate | Methylene bis-ethanethiolsulfonate | Methylene bis-1-propanethiolsulfonate | Methylene bis-1-butanethiolsulfonate | Methylene bis-benzenethiolsulfonate | Methylene bis-p-toluenethiolsulfonate |
|---|---|---|---|---|---|---|---|
| | | Percent kill | | | | | |
| 5.5 | 0.05 | 7 | | | 0 | 18 | 0 |
| | 0.1 | 47 | 64 | 35 | 28 | 0 | 4 |
| | 0.3 | 99 | 99.7 | 96 | 87 | 30 | 0 |
| | 0.5 | 99.6 | 99 | 99 | 99 | 87 | 0 |
| | 1.0 | 99.6 | 99.9 | 99 | 99.8 | 99.6 | 18 |
| | 2.0 | 99.9 | 99.7 | 99.6 | 99.99 | 100 | 74 |
| | 4.0 | 100 | 100 | 99.7 | 99.97 | 100 | 99.7 |
| | 8.0 | 100 | 100 | 100 | | 100 | 99.5 |
| 6.5 | 0.05 | 30 | | | 17 | 0 | 0 |
| | 0.1 | 76 | 0 | 0 | 28 | 8 | 14 |
| | 0.3 | 99 | 79 | 79 | 52 | 36 | 0 |
| | 0.5 | 99.9 | 99.6 | 98 | 99 | 99.5 | 40 |
| | 1.0 | 99 | 99.9 | 99 | 100 | 99.99 | 8 |
| | 2.0 | 99.7 | 99.9 | 99.98 | 100 | 100 | 99.7 |
| | 4.0 | 99.99 | 100 | 99.98 | 100 | 100 | 99.9 |
| | 8.0 | 99.99 | 99.99 | 99.98 | | 100 | 100 |
| 7.5 | 0.5 | 99 | 1 | 15 | 20 | 57 | 0 |
| | 1.0 | 99 | 51 | 20 | 88 | 99.8 | 36 |
| | 2.0 | 99.7 | 55 | 24 | 99.9 | 100 | 95 |
| | 4.0 | 99.9 | 80 | 0 | 99.99 | 100 | 100 |
| | 8.0 | 99.7 | 99.6 | 99 | | 100 | 99.99 |
| | 12.0 | 99.6 | 99.9 | 98 | | 100 | 99.98 |
| | 16.0 | 99.98 | 100 | 99.8 | | 100 | 100 |
| | 25.0 | 99.99 | | | | 100 | 100 |

EXAMPLE 8

The effect of several methylene bisesters of thiosulfonic acids on three fungi, *Aspergillus niger, Penicillium roqueforti,* and *Chaetomium globosum,* was determined as described in Example 5 of U.S. Patent 3,193,448, which disclosure is hereby made a part of this application. Growth was recorded after 14 days on the basis of the following key:

4=excellent
3=good
2=poor
1=very poor, scant, questionable
0=no growth

The results are summarized in Table 2.

We claim:
1. A compound having the formula:

$$RSO_2SCH_2SSO_2R$$

wherein R represents straight or branched chain alkyl groups containing from 1 to 6 carbon atoms; phenyl or phenyl substituted with a substituent selected from the group consisting of methyl, hydroxy or nitro.
2. The compound of claim 1 wherein R is methyl.
3. The compound of claim 1 wherein R is ethyl.
4. The compound of claim 1 wherein R is propyl.
5. The compound of claim 1 wherein R is butyl.
6. The compound of claim 1 wherein R is phenyl.
7. The compound of claim 1 wherein R is p-tolyl.

TABLE 2.—INHIBITION OF *ASPERGILLUS NIGER, PENICILLIUM ROQUEFORTI,* AND *CHAETOMIUM GLOBOSUM* BY THE COMPOUNDS LISTED BELOW IN A PULP SUBSTRATE METHOD AFTER 14 DAYS' INCUBATION

| Test organism | Concentration (p.p.m.) | Methylene bis-methanethiol-sulfonate | Methylene bis-ethanethiol-sulfonate | Methylene bis-1-propanethiol-sulfonate | Methylene bis-1-butanethiol-sulfonate |
|---|---|---|---|---|---|
| *Aspergillus niger* | 1 | 4 | 4 | 4 | 4 |
| | 3 | 4 | 4 | 4 | 4 |
| | 5 | 4 | 4 | 4 | 4 |
| | 7 | 4 | 4 | 4 | 0 |
| | 10 | 4 | 1 | 0 | 0 |
| | 15 | 4 | 0 | 0 | 0 |
| | 20 | 4 | 0 | 0 | 0 |
| | 25 | 4 | 0 | 0 | 0 |
| | 50 | 0 | 0 | 0 | 0 |
| *Penicillium roqueforti* | 1 | 4 | 4 | 4 | [1] 4 |
| | 3 | 4 | 4 | 4 | 4 |
| | 5 | 4 | 4 | 4 | 4 |
| | 7 | 4 | 4 | 4 | 4 |
| | 10 | 4 | 3 | 0 | 3 |
| | 15 | 4 | 0 | 1 | 0 |
| | 20 | 3 | 0 | 0 | 0 |
| | 25 | 2 | 1 | 1 | 0 |
| | 50 | 0 | 0 | 0 | 0 |
| *Chaetomium globosum* | 1 | 4 | 4 | 4 | [1] 4 |
| | 3 | 4 | 4 | 4 | 4 |
| | 5 | 4 | 4 | 3 | 4 |
| | 7 | 4 | 1 | 0 | 4 |
| | 10 | 3 | 0 | 0 | 4 |
| | 15 | 0 | 0 | 0 | 1 |
| | 20 | 0 | 0 | 0 | 0 |
| | 25 | 0 | 0 | 0 | 0 |
| | 50 | 0 | 0 | 0 | 0 |

4=excellent growth; 3=good; 2=poor; 1=very poor; 0=no growth.
[1] The compound obtained in Example 4 was formulated at 65 pct. concentration when tested against *Penicillium roqueforti* and *Chaetomium globosum.*

References Cited

UNITED STATES PATENTS

| | | | |
|---|---|---|---|
| 3,047,393 | 7/1962 | Herz et al. | 260—453 X |
| 3,275,506 | 9/1966 | Szabo et al. | |
| 3,282,976 | 11/1966 | Dunbar | 260—453 |
| 3,338,945 | 8/1967 | Dunbar | 260—453 |
| 3,346,592 | 10/1967 | Dunbar | 260—453 X |
| 3,356,706 | 12/1967 | Buchman et al. | 260—453 |

OTHER REFERENCES

Boldyrev et al.: Journal of General Chemistry of the U.S.S.R., volume 33, pp. 1926–1928 (1963).

CHARLES B. PARKER, Primary Examiner

S. T. LAWRENCE, Assistant Examiner

U.S. Cl. X.R.

8—94.1; 162—161; 424—303